United States Patent [19]

Boenecke

[11] 4,177,362
[45] Dec. 4, 1979

[54] TAMPERPROOF HANDSET CONNECTOR ARRANGEMENT FOR RAILROAD APPLICATIONS

[76] Inventor: Charles A. Boenecke, 1 Capshire Dr., Cherry Hill, N.J. 08003

[21] Appl. No.: 896,072

[22] Filed: Apr. 13, 1978

Related U.S. Application Data

[63] Continuation-in-part of Ser. No. 760,877, Jan. 21, 1977, Pat. No. 4,087,659.

[51] Int. Cl.² .............................................. H04M 1/15
[52] U.S. Cl. ................... 179/186; 174/65 R; 285/158
[58] Field of Search ............... 179/178, 179, 186, 103, 179/100 R; 339/129, 130; 174/65 R; 285/158, 161, 382.2

[56] References Cited

U.S. PATENT DOCUMENTS

| | | | |
|---|---|---|---|
| 2,450,528 | 10/1948 | Sprigg | 339/129 X |
| 3,214,511 | 10/1965 | Franklin | 285/158 X |
| 3,315,040 | 4/1967 | Brorein | 179/100 R |
| 3,699,498 | 10/1972 | Hardesty et al. | 339/64 M |
| 4,083,583 | 4/1978 | Volgstadt et al. | 285/55 |

FOREIGN PATENT DOCUMENTS

| | | | |
|---|---|---|---|
| 112289 | 12/1917 | United Kingdom | 174/65 R |
| 974487 | 11/1964 | United Kingdom | 179/103 |

*Primary Examiner*—Thomas W. Brown
*Attorney, Agent, or Firm*—Seidel, Gonda, Goldhammer & Panitch

[57] ABSTRACT

The handset has a cable provided with plural wires which electrically connect the handset with a communication control. The control is provided with a housing having a front panel. The cable extends through a passage in a connector having a flange, a swaged section disposed on one side of the flange, and a slotted section provided with an annular slot disposed on the other side of the flange. The flange is substantially flush with the outer surface of the housing front panel. The flange is provided with a locating pin which extends through an aperture spaced from the hole in the panel. The locating pin prevents rotation of the connector. A "C" shaped retainer is frictionally secured to the slotted section to prevent displacement of the connector with respect to the front panel. The cable is surrounded by a neoprene sleeve section which is deformed within the passage in the connector to prevent withdrawal of the sleeve section and cable from the connector.

2 Claims, 8 Drawing Figures

U.S. Patent Dec. 4, 1979 Sheet 1 of 3 4,177,362
FIG. 1
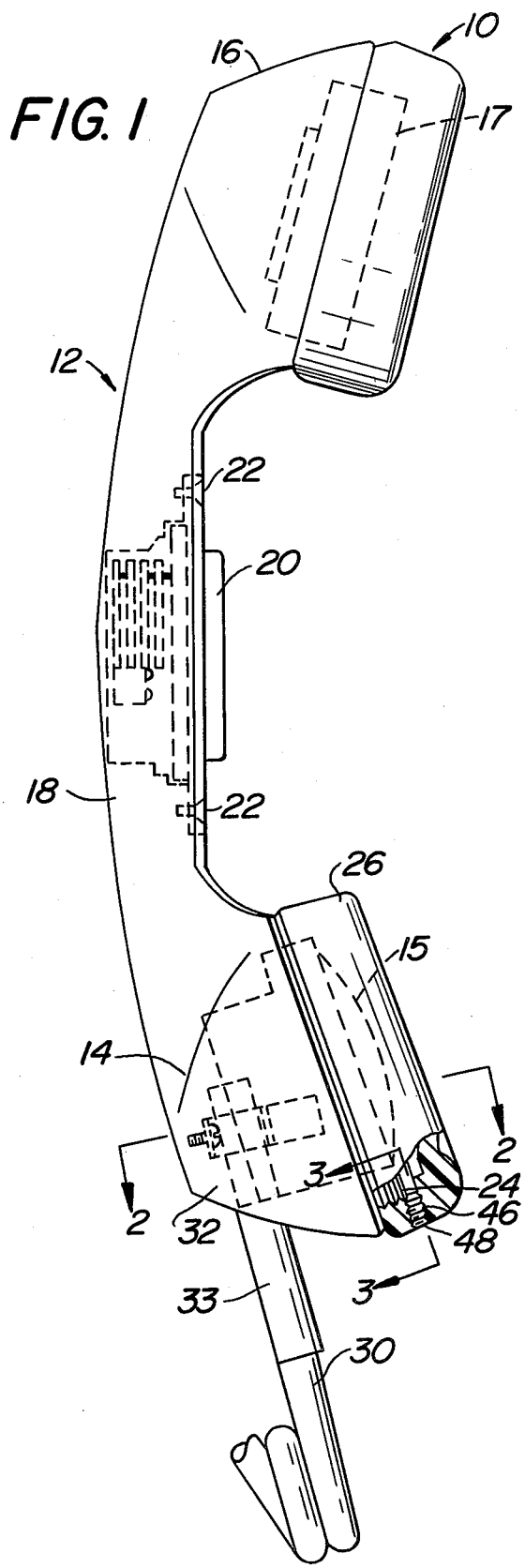
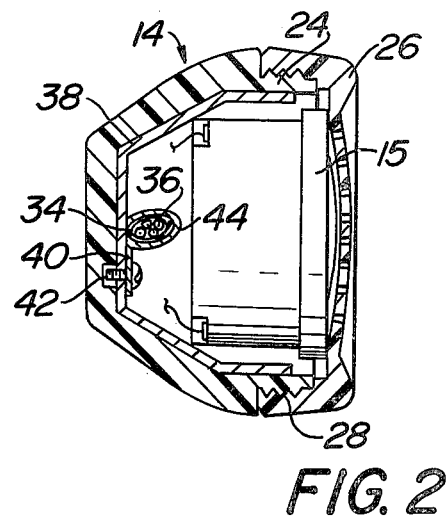
FIG. 2
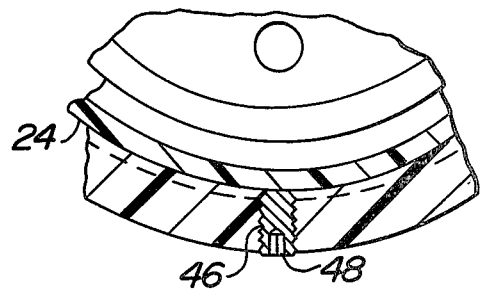
FIG. 3

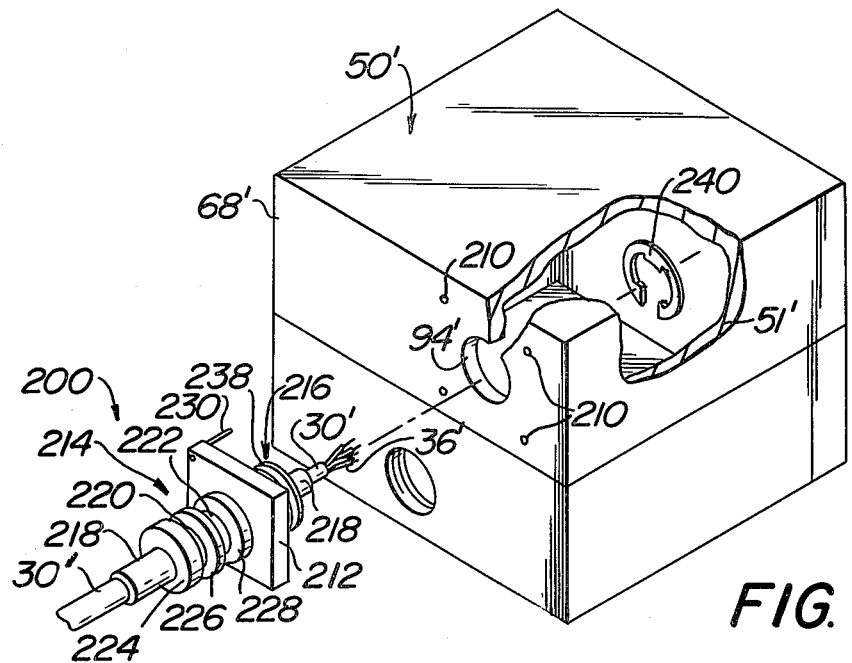
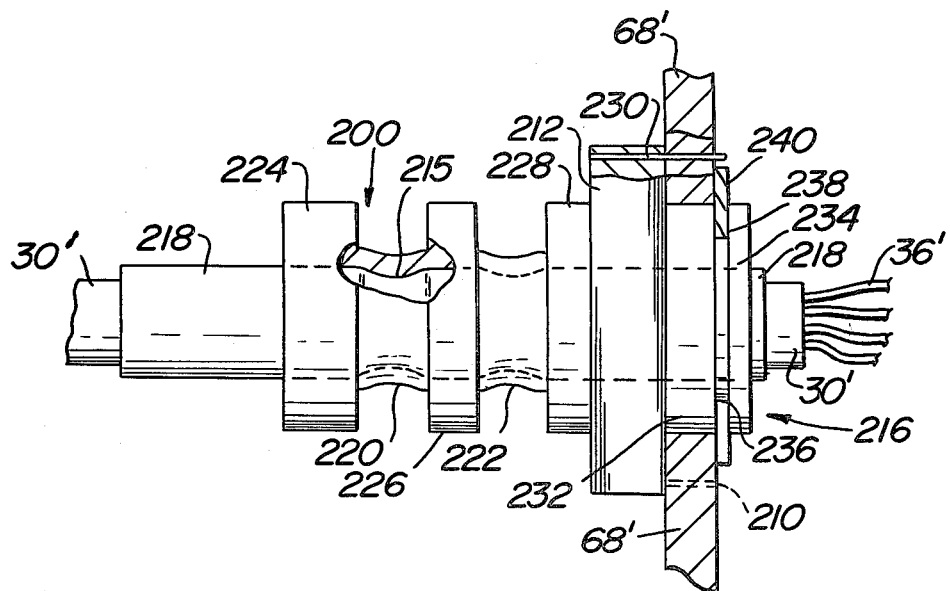

TAMPERPROOF HANDSET CONNECTOR ARRANGEMENT FOR RAILROAD APPLICATIONS

RELATED CASE

This is a continuation-in-part application based on U.S. patent application Ser. No. 760,877 filed Jan. 21, 1977 in the name of Charles A. Boenecke now U.S. Pat. No. 4,087,659.

BACKGROUND OF THE INVENTION

Communications handsets can be used with transceivers, public address systems or other communication devices located on railroad locomotives, at railroad terminals and other railway communication centers.

Handsets which have been used in railroad communication systems have utilized removable connectors to interconnect the handset to a communication control panel for a transceiver or other communication device. An example of the prior art connector is illustrated in FIG. 4 herein and will be discussed more fully hereinafter. A problem with the use of a removable interconnector is that it is removable by unauthorized persons. In recent years, railroads have sustained great losses due to the theft of communication handsets. A thief merely requires a few seconds to unscrew the connector, unplug the cable from the control panel and carry away the handset.

SUMMARY OF THE INVENTION

The tamperproof handset connector arrangement of the present invention includes a cable and a plurality of wires disposed within the cable for connecting the handset to a communication control. The communication control has a housing provided with a front panel. The front panel has a hole and plural apertures spaced from the hole. The handset includes a connector having a flange, a swaged section and a slotted section. A passage extends through the connector. The cable passes through the passage into the interior of the control housing. The flange has a locating pin projecting therefrom. The flange is substantially flush with the outer surface of the front panel, and the slotted section extends through the panel hole into the interior of the housing. A retainer is frictionally secured to the slotted section. The locating pin extends through one of the panel apertures.

In the preferred embodiment, a neoprene sleeve section surrounds the cable and is frictionally secured by deformation with the connector passage.

An advantage of the invention is that the handset connector cannot be removed by unauthorized persons from the communication control housing by pulling or rotation.

Another advantage of the invention is that the handset cable cannot be removed by unauthorized persons from the handset connector.

Other advantages appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a side view, partially broken away, of a handset of the present invention.

FIG. 2 is a cross-sectional view taken along line 2—2 of FIG. 1.

FIG. 3 is a cross-sectional view taken along line 3—3 of FIG. 1.

FIG. 7 is a view of the connector of the present invention prior to insertion in the panel of a communication control.

FIG. 8 is a view in cross-section of the connector of the present invention inserted in the panel of the communication control.

DETAILED DESCRIPTION OF THE INVENTION

Figure 4:
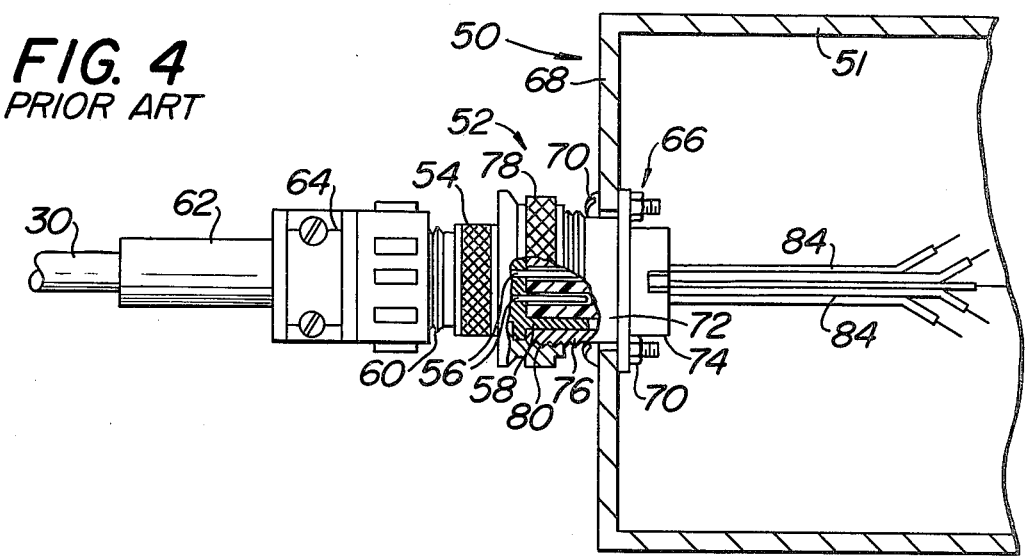
FIG. 4 is a side view, partially broken away, illustrating a connector of the prior art connecting a cable to the panel of a communication control.

Referring to the drawings in detail, wherein like numerals indicate like elements, there is shown in FIG. 1 a handset designated generally as 10. The handset 10 includes a handset housing 12. The handset housing 12 has a transmitter end 14 with a receiver 15 disposed within it and a receiver end 16 with a receiver 17 disposed within it. A handle portion 18 interconnects the transmitter end 14 with the receiver end 16. A control switch or button 20 is removably attached to the handle portion 18 by a pair of screws 22.

The outer periphery of the transmitter end 14 has a threaded portion 24. A transmitter cap 26 has an internal threaded surface 28. The internal threaded surface 28 is adapted to screw onto the threaded portion 24 of the transmitter end 14. A cable 30 passes through a hole 32 in the transmitter end 14. The cable 30 has an outer covering 34 surrounding a plurality of wires 36 disposed within the cable 30. The cable 30 extends into the interior of the handset housing 12 by way of the hole 32. A sleeve 33 preferably surrounds the cable 30 in the area where the cable 30 enters the transmitter end 14. A generally U-shaped bracket 38 is fitted within the interior of the transmitter end 14. It is preferable that the U-shaped bracket 38 fit substantially flush with the interior surface of the transmitter end 14. A clamp 40 is removably secured to the bracket 38 by a screw 42. The clamp 40 includes a curved section 44 which is adapted to fit about the covering 34 of the cable 30. The curved section 44 is crimped about the cable 30 and thereby squeezes upon and frictionally holds the cable 30. The cable 30, therefore, cannot be readily pulled out of the handset housing 12 without first removing the clamp 40.

In order to remove the clamp 40, a person must first gain access to the interior of the transmitter end 14 by removing the transmitter cap 26 and the transmitter 15. The transmitter cap 26 has a threaded hole 46 extending completely therethrough. A threaded screw 48 threads into the hole 46. In order to prevent the unauthorized removal of the transmitter cap 26, the screw 48 is threaded into the hole 46 until it firmly bears upon the threaded surface 24. The transmitter cap 26 thereby cannot be rotated and unscrewed, unless the screw 48 is loosened. The screw 48 is preferably an Allen screw. Also, the screw 48 has a length such that the screw 48 is flush with or below the outer periphery of the transmitter cap 26 whenever the screw 48 has been tightened down onto the threaded portion 24. In this manner, the unauthorized removal of the clamp 40 is greatly hampered since an Allen wrench is required to remove the screw 48 before the transmitter cap 26 can be removed.

In FIG. 1, one end of the cable 30 is shown connected in the handset housing 12. The other end of the cable 30 is connected to terminal strips (not shown) in a conventional communication control 50 having a housing 51. See FIG. 4. The communication control 50 may itself be electrically connected to a transceiver or other communication device (not shown). The cable 30 is typically connected to the control 50 by way of a standard well-known removable type connector 52. The removable connector 52 includes an inner cylindrical member 54, which has a plurality of male prongs 56 extending from one end thereof. The male prongs 56 are surrounded by a cylindrical flange 58. The inner cylindrical member 54 also includes a section having a threaded periphery 60. The cable 30 is received within the inner cylindrical member 54, and the wires 36 are connected to the prongs 56 in a conventional manner. A sleeve 62 surrounds the cable 30 and extends at least partially into the inner cylindrical member 54. A clamp 64 is secured about the sleeve 62 and threads onto the threaded periphery 60 in order to secure the sleeve 62 and cable 30 relative to the connector 52.

A female connector 76 is secured to a front panel 68 of the control housing 51 by means of a plurality of nuts and bolts 70. The connector 76 can be easily removed by unthreading the nuts and bolts. The female connector 66 includes an outer section 72 extending outwardly from the front panel 68 and an inner section 74 extending within the control housing 51. The outer section 72 includes a section having a threaded peripheral surface 76. The removable connector 52 includes an annular ring 78. The annular ring 78 has an inner threaded portion 80. The inner threaded portion 80 screws onto the threaded peripheral surface 76. The outer section 72 includes a plurality of female receptacles 82 for receiving the prongs 56. The female receptacles 82 are electrically connected to wires 84. The wires 84 are wired in a conventional manner to appropriate terminal strips within the control housing 51.

In order to connect a handset 10 to a control 50 by means of the conventional connector 52, the cylindrical flange 58 of the inner cylindrical member 54 is slipped into the outer section 72 of the female connector 66. The male prongs 56 thus mate with the female receptacles 82 to provide an electrical connection between the handset 12 and the control 50. The connector 52 is removably secured to the control housig 51 by tightening down the annular ring 78 onto the outer section 72 of the female connector 66. While the connector 52 provides a simple and easy method for connecting a handset 12 to a control 50, the use of such a connector 52 also facilitates the easy removal of the handset 10 by unauthorized persons.

Figure 5:
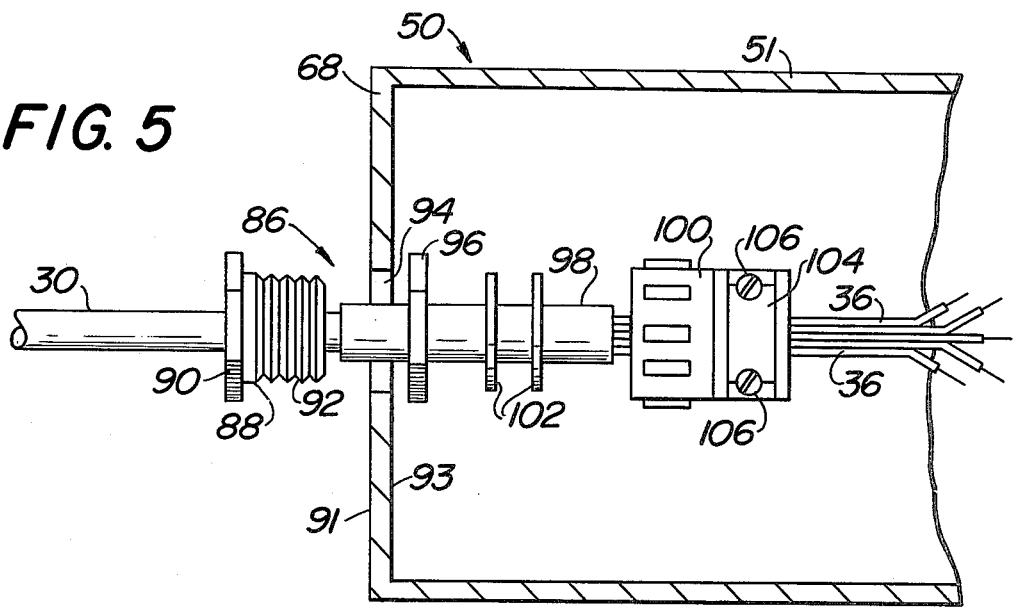
FIG. 5 is a side view of the connector of the present invention, shown with its parts exploded.
Figure 6:
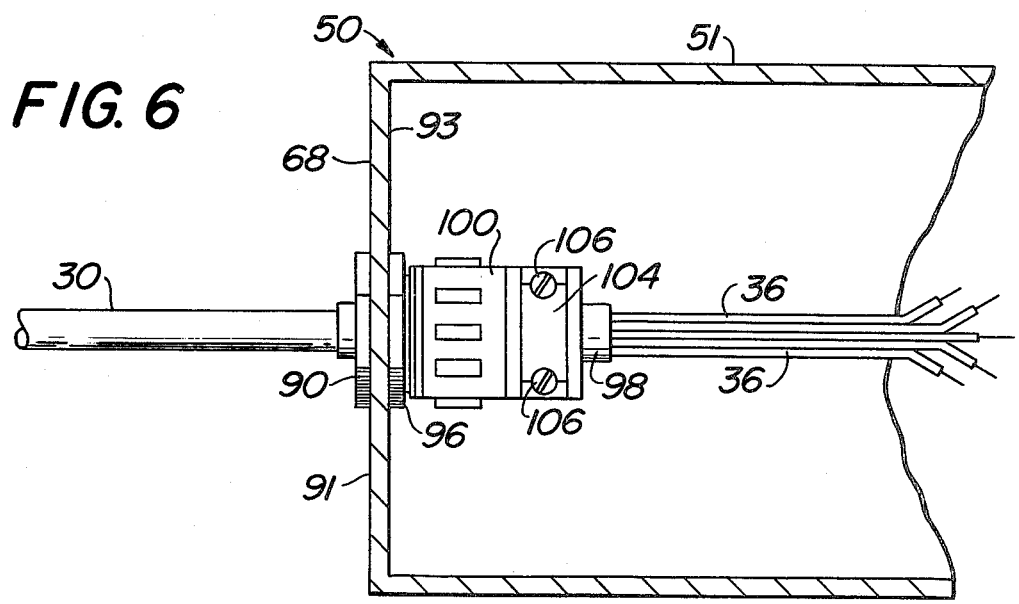
FIG. 6 is a side view of the connector of the present invention secured to the panel of a communication control.

In order to prevent the removal of the handset 10 by unauthorized persons, a connector 86 may be employed. See FIGS. 5 and 6. The connector 86 includes a bushing 88, a flange 90 and a threaded section 92. The connector 86 is installed on the housing 51 by insertion of the bushing 88 and threaded section 92 in hole 94. The flange 90 rests upon or is substantially flush with the outer surface 91 of the panel 68, and a nut 96 threads onto the threaded section 92 and tightens down upon the inner surface 93 of the panel 68. The connector 86 is thus secured to the control housing panel 68.

The cable 30 passes through a cylindrical passage (not shown) within the connector 86 and extends into the interior of the control housing 51. A sleeve 98 preferably surrounds the cable 30 in the area where the cable 30 passes through the connector 86 and in the area extending on either side of the connector. A clamp 100 having an internally threaded surface (not shown) screws onto the threaded section 92 and is thereby secured to the connector 86. Anti-friction devices such as washers 102 are preferably interposed between the clamp 100 and the nut 96.

The clamp 100 includes a clamp-down section 104, which is tightened down upon the sleeve 98 and the cable 30 by a pair of screws 106. The clamp 100 has a greater transverse dimension than the hole 94. In this manner, the clamp 100 in combination with the connector 86 fixedly secures the cable 30 in position at the control housing panel 68. The wires 36 are wired in conventional manner to appropriate terminal strips (not shown) within the control housing 51. The clamp 100 prevents the sleeve 98 and cable 30 from being withdrawn from the connector 86. The nut 96 prevents the connector 86 from being withdrawn from the housing 51. In this manner, the easy removal and theft of a handset 10 is discouraged since the cable 30 cannot be removed without first gaining access to the interior of the control.

The connector 86 and clamp 100 are suitable for use in a communication control 50 having internal components which are not disposed in proximity to hole 94 in front panel 68. Where such internal components, however, are located in proximity to the hole 94, it has been found that the components may impede the rapid assembly of the clamp 100 on sleeve 98. Thus, it may be difficult to rapidly install clamp 100 and thread the nut 96 on the threaded portion 92 of connector 86. In FIGS. 7 and 8, there is shown a connector 200 according to the present invention which may be rapidly installed and secured to the housing 51' of a conventional communication control 50' without any need for the clamp 100 or like component within the interior of housing 51'. Thus, although the control 50' may have internal components disposed in proximity to the hole 94' in front panel 68', the connector 200 may be rapidly installed in the hole 94' without impediment. The manipulation of relatively large components, such as clamp 100, in the interior of the communications control 50' is eliminated by the invention.

The front panel 68' of the conventional communication control 50' is provided with four standard spaced apertures 210 in which the standard female connector 66 is secured by screws and nuts 70. See FIGS. 4 and 7. To install connector 200, the standard female connector 66 and the screws and nuts 70 are removed from panel 68'.

The connector 200 is provided with a rectangular flange 212 and a swaged section 214 disposed on one side of the flange. A slotted section 216 is disposed on the other side of the flange 212. Preferably, the flange 212, swaged section 214, and slotted section 216 constitute an integral unit. The connector 200 is provided with a passage 215 extending therethrough. See FIG. 8.

Preferably, the connector 200 is first slipped over a neoprene sleeve section 218 which surrounds a portion of the cable 30'. The barrel portions 220 and 222 of section 214 are then swaged in conventional manner to deform the neoprene sleeve section 218 within the passage 215, the sleeve section 218 then being frictionally secured to the connector 200 with cable 30' fixed within the sleeve. Accordingly, the cable 30' cannot be withdrawn or pulled away from the connector 200.

As previously mentioned, the connector 200 is provided with a passage 215 extending through the swaged section 214, the flange 212 and the slotted section 216. The swaged section 214 includes annular portions 224, 226 and 228. The cross-section of the portions of passage 215 extending through the annular portions 224, 226 and 228 is slightly greater than the cross-section of the portions of passage 215 extending through the swaged barrel portions 220 and 222. Thus, when the barrel portions 220 and 222 are swaged, the neoprene sleeve 218 deforms and fills the passage 215. This provides a tight friction fit between the connector 200 and sleeve 218 and prevents the withdrawal of the sleeve 218 from the connector 200.

To prevent rotation of the connector 200, the flange 212 is provided with a locating pin 230 which may be inserted in any one of the apertures 210. See FIG. 8. With locating pin 230 lodged in one of the apertures 210, the flange 212 is flush against the outer surface of front panel 68' and the connector 200 cannot be rotated.

The slotted section 216 extends through the hole 94' into the interior of the control housing 51. The slotted section 216 comprises annular portions 232 and 234 separated by a barrel portion 236 which together define an annular slot 238. The annular slot 238 is disposed within the interior of the control 50'. A "C" shaped retainer 240 is squeezed over barrel portion 236 of slotted section 216 to lock the connector 200 in position at front panel 68'. The retainer 240 prevents withdrawal or displacement of the connector 200 with respect to the control panel 68' while locating pin 230 prevents rotation of the connector in position at the front panel 68'.

It should be apparent that the only portion of the connector 200 disposed within the interior of the control 50' is the slotted section 216 and the locating pin 230. The only other element required to be disposed within housing 51' is the retainer 240. There is no need for any other element, such as the clamp 100 in FIG. 6, to install the connector 200 on housing 51'. Accordingly, although internal components of the control 50' may be located in proximity to the hole 94', the connector 200 can be readily inserted in the hole 94' from the exterior of the control housing 51', and the retainer 240 can be easily manipulated into position in the annular slot 238 to secure the connector to the front panel 68'.

As should be clear from the above discussion, a tamperproof handset connector arrangement is thus provided. At the handset end of the system, the use of the set screw 48 in conjunction with the clamp 40 prevents unauthorized access to the handset housing or its removal. At the control end of the system, the connector 200 in conjunction with the retainer 240 prevent the unauthorized removal of the cable 30'.

The present invention may be embodied in other specific forms without departing from the spirit or essential attributes thereof and, accordingly, reference should be made to the appended claims, rather than to the foregoing specification as indicating the scope of the invention.

I claim:

1. A tamperproof handset connector arrangement for installation in a railroad communication control having a housing provided with a front panel which has a hole and plural apertures spaced from the hole, the handset having a cable and a plurality of wires disposed within said cable for electrically connecting said control and handset, said connector arrangement comprising:

a connector having a flange, a swaged section disposed on one side of said flange, and a slotted section having an annular slot disposed on the other side of said flange, said flange having a locating pin projecting therefrom on said slotted section side, said connector having a passage extending therethrough, said flange being substantially flush with the outer surface of said housing front panel and said slotted section extending through said panel hole into said housing, said locating pin extending through one of said spaced apertures to prevent rotation of said connector, a retainer disposed within said annular slot and frictionally secured to said slotted section to prevent displacement of said connector with respect to said front panel, said handset cable passing through said connector passage into the interior of said housing.

2. A tamperproof handset connector arrangement according to claim 1 including a sleeve section surrounding said handset cable, said sleeve section being frictionally secured by deformation within said connector passage.

* * * * *